Patented Apr. 23, 1935

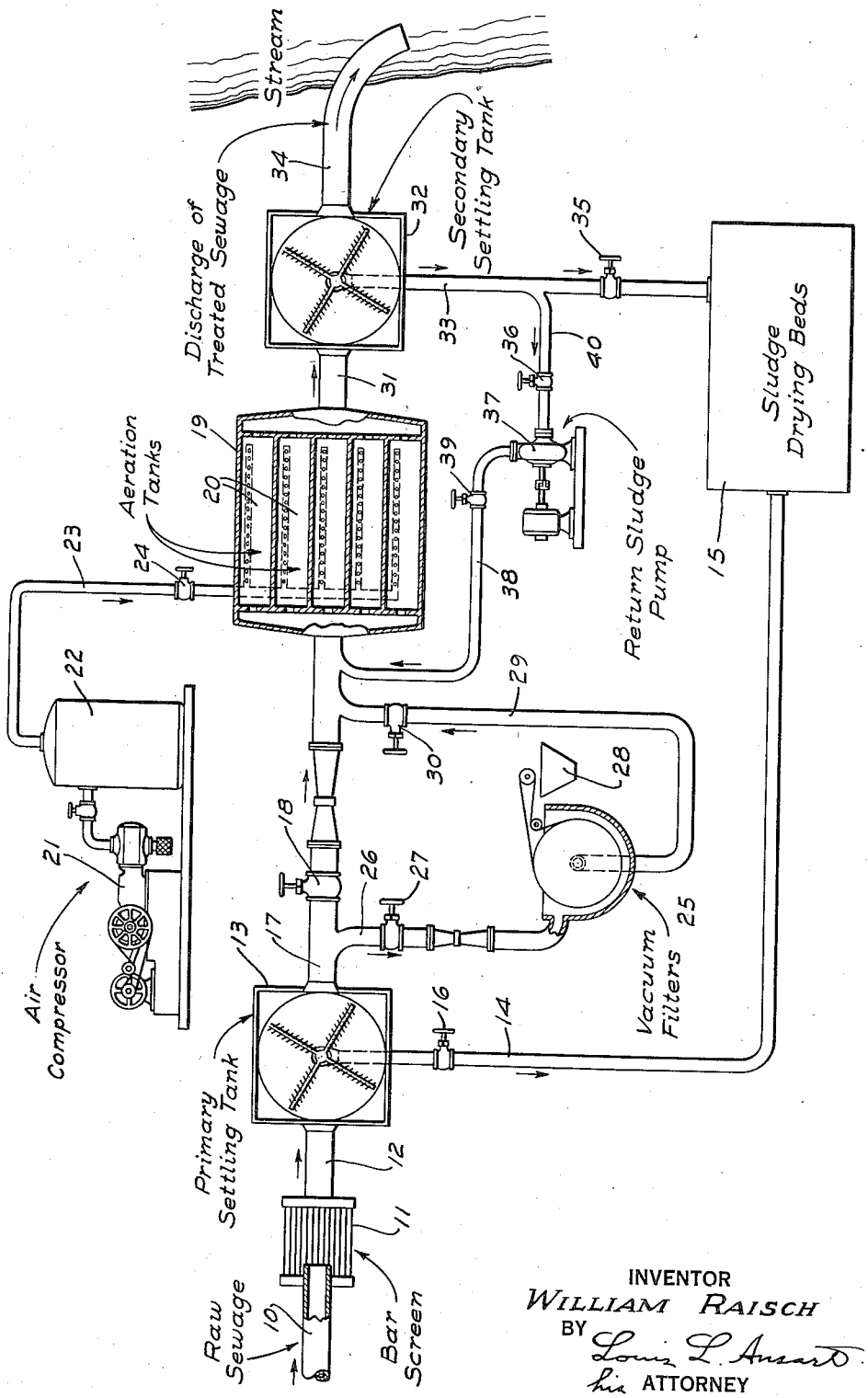

1,999,058

UNITED STATES PATENT OFFICE 1,999,058

ACTIVATED SLUDGE SEWAGE TREATMENT

William Raisch, Forest Hills, N. Y., assignor to Municipal Sanitary Service Corporation, a corporation of New York Application August 30, 1932, Serial No. 631,053

9 Claims. (Cl. 210—8)

This invention relates to sewage treatment by activated sludge processes.

In such processes of sewage treatment, the degree of purification required depends largely upon the volume of diluting water in the stream or body of water into which the purified effluent flows. Furthermore, regardless of the amount of diluting water available for disposal of the treated sewage, it is necessary to adopt a process which will be odorless and which will require a limited area for the necessary plant. The trend is to make processes more reliable by mechanical means to get away from uncertain biological actions. In substantially all cases the raw sewage is first subjected to screening and then to sedimentation. The screening step removes bulk solids and a portion of the remaining solids suspended in the sewage is removed by sedimentation in the second step.

Where bacteriological treatment is contemplated as in the activated sludge process, it is essential to remove as much of the coarse solids as possible before the bacteriological oxidizing treatment is started. According to the process heretofore in extensive use, the sewage after treatment by screening and by sedimentation (usually about 1 to 2 hours) in a primary settling tank is conveyed to aeration tanks in which it is subjected to the action of aerobic bacteria encouraged by aeration as by forcing air from a suitable air compressor into the aeration tanks in such a manner as to mix thoroughly with the sewage therein. After aeration and oxidation for a considerable length of time (for example, six to eight hours), the sewage is transferred to a secondary settling tank (where it may remain another period of 1½ to 2 hours) from which the overflow of treated sewage or the final affluent is discharged, for example, into a stream or body of water.

From the primary settling tank or sedimentation unit, the raw sludge in the bottom thereof is transferred, by pumping, if required, to a suitable place for disposal, such as sludge drying beds. The activated sludge is drawn from the bottom of the secondary settling tank and the greater proportion thereof is also transferred to a suitable point of disposal such as the sludge drying beds to which the sludge from the primary settling tank is also transferred. In order to keep up the proper action and cultivate the liquid in the aeration tanks, part of the activated sludge taken from the secondary settling tank is returned into the aeration tanks. Usually about 25% of the activated sludge from the secondary settling tank is returned to the aeration tanks.

Inasmuch as the amount of air required in the activated sludge process depends almost entirely upon the amount of organic solids in the sewage, which solids are to be oxidized, the amount of air necessary for use in connection with processes heretofore in use is very great.

While it is true that a considerable quantity of such organic solids are removed from the primary settling tank or tanks before the sewage is passed through the aeration tanks, there is a limit to the amount of solids that can be removed in this manner. As a matter of fact, it is considered that about 50% of the suspended solids contained in the original raw sewage can be taken out by the screens and in the primary settling tank or tanks.

If a greater proportion of removal is desired, other means must be employed such, for example, as chemical precipitation which, however, gives rise to very serious disadvantages inasmuch as the chemicals used in chemical precipitation interfere materially with the bacteriological activities upon which the activated sludge process is based. Another method might be to increase the period of sedimentation but in doing so the area covered by the tanks is proportionately increased making the cost prohibitive and on the whole impracticable.

It is an important object of the invention to provide improved methods of activated sludge treatment of sewage. Another important object of the invention relates to the provision of improved apparatus for carrying out activated sludge processes. Further objects relate to the provision of apparatus and process which are very flexible in operation. It is a feature of the invention to provide a process whereby the cost of operation will be much lower than for processes heretofore used. Other features relate to reductions in cost of the plant and in cost of operation. Also, various features of the invention relate to provisions whereby superior effects may be obtained at a minimum of cost.

Preferably the present invention may be carried out in the following manner. In order to remove a much larger quantity of sludge than usual from the sewage before the sewage passes into the aeration tanks, resort may be made to forced filtration as by means of a vacuum filter or vacuum filters, to which is fed as large a proportion as is found desirable of the overflow from the primary settling tank or tanks, the remainder of such overflow being passed directly to the aeration tanks. The vacuum filter or filters remove substantially all of the suspended solids from the sewage fed thereto and the filtrate, substantially free from suspended solids, passes from the vacuum filter or filters to the aeration tank. The solid matter removed by the vacuum filter may be disposed of in any suitable manner. In this way the amount of suspended solids in the sewage entering the aeration tanks is very much reduced, thus reducing the requirements for compressed air and rendering the operation very much cheaper inasmuch as the power required for a vacuum filter is very much less than that which would be required for additional air-compressor capacity.

If desired, practically 100% of the solids in all the sewage could be removed by the vacuum filters. If, however, it be undesirable to remove all of the suspended solids before passing the liquid to the aeration tanks, then, as already referred to, a part of the raw sewage may be by-passed direct to the aeration tanks, the balance going through the filters and then passing to the aeration tanks. It will be evident that the process of the present invention is very flexible and can be adjusted to meet any condition of septicity. This flexibility is a very important feature in any sewage process, inasmuch as raw sewage has characteristics far different from sewage which has been aerated for six or eight hours.

Other objects, features and advantages will appear upon consideration of the following description and of the drawing, in which the figure is a diagrammatic representation of a preferred form of apparatus for carrying out the method.

As illustrated in the drawing, raw sewage is fed through a pipe or duct 10 to a bar screen 11 which serves to remove the bulky solids which would otherwise cause trouble in the later processes, in that they are often of entirely different character from the other solids in the sewage. From the bar screen 11, the sewage passes through a pipe or duct 12 to a primary settling tank 13.

In settling tanks of the character indicated the sewage is brought in beneath the level of the liquid so as to not disturb the surface thereof and the solids gradually settle toward the bottom and are gradually worked toward the center by scrapers or the like on the arms of a rake structure which is rotated slowly above a vertical axis. The sludge collected at the bottom of the primary settling tank is drawn out of the bottom thereof and passes through a duct or pipe 14 to sludge drying bed 15. When no sludge is being passed the pipe 14 may be closed by valve 16.

The settling action in the tank 13 serves to clarify the liquid in the upper part thereof and, as solids tend to drop, the clarified liquid will overflow and be discharged through a pipe or duct 17. The pipe 17 is provided with a valve 18 and is connected with an aeration section 19 which may include a plurality of tanks 20 of the spiral flow or channel type. Heretofore it has been a general practice to pass the sewage directly from the primary settling tank to aeration tanks. This, however, requires the bacteriological treatment in the aeration tanks of a relatively large and constantly varying quantity of solids thus requiring the supply to the aeration tanks of a large quantity of compressed air which may be supplied thereto by means of a compressor 21, a compressed air tank or receiver 22 and a pipe 23 controlled by valve 24.

It will be evident that, if a large proportion of the suspended solids, say 75% or possibly 100%, be removed in advance, the solid matter to be oxidized in the aeration tanks will be very much less in quantity and consequently very much less air will be required, thus cutting down very substantially the cost of operation. The present invention involves the removal of such suspended solids and to this end provision may be made of one or more vacuum filters 25 receiving settled sewage from the line 17 back of the valve 18 and through a pipe 26 controlled by valve 27. These vacuum filters are mechanical units and permit a removal of substantially 100% of the settled solids. Preferably these vacuum filters are of the Feinc type, which type is based on the patent to Wright & Young, Number 1,472,574, granted October 30, 1923, the residue being discharged into one or more troughs or receptacles 28 and the filtrate being discharged through a pipe 29 controlled by a valve 30 into the pipe 17 near the aeration tanks. It will be evident that by passing more or less of the settled sewage through the vacuum filters the amount of solids to be oxidized in aeration tanks may be controlled substantially as desired and the control may be varied at a moment's notice. It will be seen that by this method I can prevent overloading of the aeration tanks.

After treatment in the aeration tanks which may have lasted for several hours, the sewage containing activated sludge is discharged through a pipe 31 into a secondary settling tank 32 which may be of the same type as the primary settling tank, the sludge being discharged from its bottom through a pipe 33 and the clarified effluent being discharged through a pipe 34 into any suitable means for disposal such as a stream. The greater part of the activated sludge may be passed through the pipe 33 to the sludge drying beds.

It is desirable however to return a portion of the activated sludge, which now contains aerobic bacteria, to the aeration tanks to assist in the bacteriological action in these tanks. To this end the pipe 33 is provided with a branch 40 and the proportion of the activated sludge to be returned to the aeration tanks may be controlled by valve 35 in the line 33 between the branch 40 and the sludge drying beds and a valve 36 in the branch 40. Sludge entering the branch 40 may be returned to the aeration tanks in any suitable manner, as by means of a pump 37 connected with a branch 40 to receive the activated sludge therefrom and with a pipe or duct 38 which discharges into the aeration tanks through a portion of the pipe 17 with which it connects. The pipe 38 may also be provided with a valve 39.

It will be evident that, by the introduction of one or more vacuum filters 25, it will be made possible to use a much smaller air compressor installation. This will reduce very substantially the cost of installation in view of the relatively small cost of the vacuum filters as compared with the saving in view of the smaller required size of the air compressor installation or by reducing the size of the aeration tanks as less time is required for oxidation. It will also be evident that the increase in cost of operation due to the vacuum filters will be very much less than the saving due to the smaller required capacity of the air compressor plant.

It should be understood that various changes may be made in the process and apparatus and that certain features may be used without others without departing from the true spirit and scope of the invention.

Having thus described my invention, I claim

1. An activated sludge process of sewage treatment, comprising removal of solids from the sewage by sedimentation, forced filtration of part of the resulting effluent, and mixing of the resulting filtrate and the rest of said effluent, and aeration of the mixture thus formed.

2. An activated sludge process of sewage treatment, comprising removing solids by settling, suction-filtering part of the resulting effluent, bringing together the filtrate and the remainder of said effluent and subjecting them to aerobic bacterial action.

3. An activated sludge process of sewage treatment, comprising removing the larger solids, forced filtering substantially half of the resulting effluent, bringing together the resulting filtrate and the remainder of said effluent and subjecting them to aerobic bacterial action.

4. An activated sludge process of sewage treatment, comprising removing the larger solids by settling, suction-filtering substantially half of the resulting effluent, bringing together the resulting filtrate and the remainder of the effluent, and subjecting them to aerobic bacterial action.

5. In apparatus for continuous activated sludge sewage treatment, a settling tank, means for drawing off sludge from the bottom of said tank, aeration means; means including a duct for continuously supplying supernatant liquid from the settling tank to the aeration means, a filter in said duct, a by-pass around said filter, and means to control the relative amounts of sewage passing through the by-pass and the filter.

6. An activated sludge process of sewage treatment, comprising removing the larger solids, further reducing the proportion of solids in the resulting effluent by forced filtration of part of said effluent and bringing together the resulting filtrate and the remainder of said effluent thereby producing a modified effluent, and subjecting the modified effluent to aerobic bacterial action.

7. In apparatus for continuous activated sludge sewage treatment, settling means, means for drawing off sludge from said settling means, aeration means, means for passing supernatant liquid from said settling means to said aeration means, filtration means interposed in such liquid-passing means, means for by-passing supernatant liquid around said filtration means, and means for controlling the relative amounts of supernatant liquid passing through the by-passing means and the filtration means.

8. An activated sludge process of sewage treatment comprising the steps of removing the larger solids by sedimentation in a sedimentation tank, thereafter aerating the sewage effluent from said tank in aeration apparatus, and subsequent to such sedimentation but prior to such aeration removing by forced filtration variable additional amounts of solids from said effluent to maintain the solid content of the sewage effluent delivered to the aeration apparatus within the maximum capacity of the aeration apparatus.

9. An activated sludge process of sewage treatment comprising removing the larger solids in apparatus adapted to that purpose, subsequently aerating in aeration apparatus the sewage effluent from the larger-solid-removing means, and, subsequent to the larger-solid-removing operation and prior to the aeration, removing by forced filtration variable amounts of additional solids from said sewage effluent to maintain the solid content of the sewage effluent delivered to the aeration apparatus within the maximum capacity thereof.

WILLIAM RAISCH.